United States Patent
Sato et al.

(10) Patent No.: US 9,658,043 B2
(45) Date of Patent: May 23, 2017

(54) OPTICAL TEST APPARATUS

(71) Applicant: MITSUBISHI HEAVY INDUSTRIES, LTD., Tokyo (JP)

(72) Inventors: Mariko Sato, Tokyo (JP); Shojiro Furuya, Tokyo (JP); Daichi Miyoshi, Tokyo (JP); Yukito Hata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 164 days.

(21) Appl. No.: 14/672,479

(22) Filed: Mar. 30, 2015

(65) Prior Publication Data

US 2015/0276364 A1 Oct. 1, 2015

(30) Foreign Application Priority Data

Mar. 31, 2014 (JP) ................. 2014-074465

(51) Int. Cl.
| | | |
|---|---|---|
| F24B 15/08 | (2006.01) |
| F42B 15/08 | (2006.01) |
| F42B 15/01 | (2006.01) |
| F42B 35/00 | (2006.01) |
| H04N 17/00 | (2006.01) |
| F41G 7/00 | (2006.01) |
| G01S 3/78 | (2006.01) |

(52) U.S. Cl.
CPC ............. *F42B 15/08* (2013.01); *F41G 7/004* (2013.01); *F42B 15/01* (2013.01); *F42B 35/00* (2013.01); *G01S 3/7803* (2013.01); *H04N 17/002* (2013.01)

(58) Field of Classification Search
CPC .......... F42B 15/08; F42B 15/01; F42B 35/00; H04N 17/002; F41G 7/004; G01S 3/7803
See application file for complete search history.

(56) References Cited

U.S. PATENT DOCUMENTS

| | | | | |
|---|---|---|---|---|
| 8,743,373 B1 * | 6/2014 | Gutin | ............... | G01B 9/02039 |
| | | | | 356/512 |
| 2007/0158555 A1 * | 7/2007 | Ward | ............... | B82Y 10/00 |
| | | | | 250/309 |
| 2007/0221843 A1 * | 9/2007 | Ward | ............... | B82Y 10/00 |
| | | | | 250/309 |

FOREIGN PATENT DOCUMENTS

JP 3185603 7/2001

\* cited by examiner

*Primary Examiner* — Richard Camby
(74) *Attorney, Agent, or Firm* — Wenderoth, Lind & Ponack, L.L.P.

(57) ABSTRACT

An optical test apparatus includes a three-dimensional dome, light sources and a control unit. The three-dimensional dome covers a field of view of an image acquisition device. The image acquisition device is a test target device. The light sources are dispersedly arranged on the three-dimensional dome and generate a predetermined image on the three-dimensional dome. The first control unit controls the light sources.

9 Claims, 8 Drawing Sheets

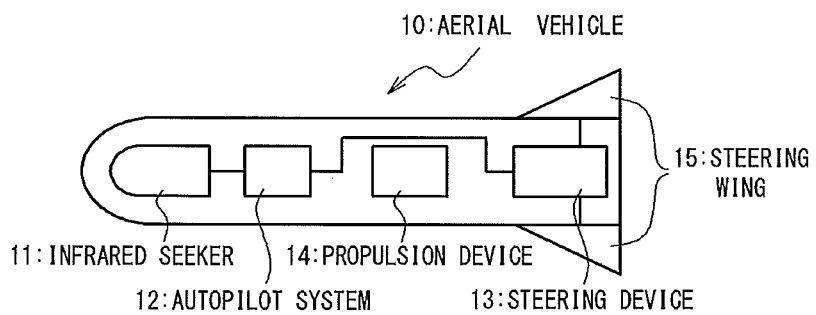
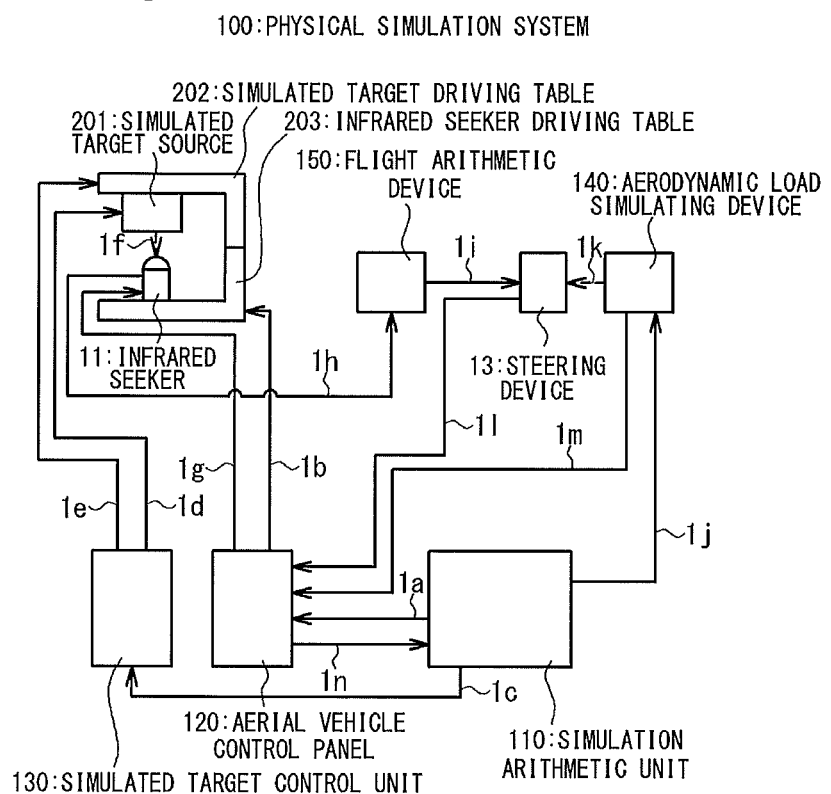

US 9,658,043 B2

OPTICAL TEST APPARATUS

CROSS REFERENCE

This application claims a priority based on Japan Patent Application No. JP 2014-74465 filed on Mar. 31, 2014, the disclosure of which is hereby incorporated by reference herein in its entirety.

TECHNICAL FIELD

The present invention relates to an optical test apparatus, and can be used for testing, for example, an image acquisition device such as an infrared seeker of an aerial vehicle.

BACKGROUND ART

Patent Literature 1 discloses a simulator having characteristics described below. The simulator includes a database section, a simulation setting section, a target simulated light emitting section, a target light source controlling section, a simulated target unit, a simulated movement driving section, a simulated movement controlling section, a dome, a target detection device, a test target system, a measuring section for measuring an atmospheric transmittance in the dome, and a correction data processing section. Note that the database section stores data which are necessary to reproduce the scene including the target to be simulated and the background. The simulation setting section sets various conditions for performing a simulation to reproduce the scene, and supplies the read data from the database section, which correspond to the set conditions, to each control section. The target simulated light emitting section has a light source to simulate a target. The target light source controlling section controls an operation of the target simulated light emitting section based on the read data from the database section. The simulated target unit includes the target simulated light emitting section therein and has functions necessary for the target to be simulated. The simulated movement driving section moves the simulated target unit as if the actual target moves. The simulated movement controlling section controls an operation of the simulated movement driving section based on the read data from the database section. The dome includes the simulated target unit and the simulated movement driving section therein, and simulates the background by the inner wall. The dome simulates the target by moving the simulated target unit along the inner wall. The target detection device detects the scene, which is a simulated scene on the inner wall of the dome. The test target system is disposed inside the dome and includes a target detection device therein. The test target system performs evaluation based on the detected scene. The measuring section for measuring an atmospheric transmittance in the dome is disposed inside the dome, and has a black body furnace and a spectroscopic analyzer. The measuring section measures the spectral intensity of a black body furnace through the air by the spectroscopic analyzer. The correction data processing section calculates the atmospheric transmittance based on the measured spectral intensity data, and supplies the calculated atmospheric transmittance to the simulation setting section. The simulator controls the light intensity of the light source of the target simulated light emitting section by the target light source controlling section based on the calculated atmospheric transmittance.

However, the simulator described in the Patent Literature 1 is still complex and has a large-size.

CITATION LIST

Patent Literature

[Patent Literature 1] Japanese Patent No. 3185603B2

SUMMARY

An object of the present invention is to provide an optical test apparatus, which is more compact, easy to handle, simpler in its configuration and less likely failed.

An optical test apparatus according to some embodiments includes a three-dimensional dome, light sources and a control unit. The three-dimensional dome covers a field of view of an image acquisition device. The image acquisition device is a test target device. The light sources are dispersedly arranged on the three-dimensional dome and generate a predetermined image on the three-dimensional dome. The first control unit controls the light sources.

According to some embodiments, it is possible to reduce the size of the optical test apparatus and simplify its configuration because the physical movement of the simulated target source is unnecessary.

BRIEF DESCRIPTION OF THE DRAWINGS

The accompanying drawings are incorporated into the specification to assist in explaining some embodiments. The drawings are not to be construed as limiting the inventions to only those examples illustrated and described.

FIG. 1A is a schematic diagram of an aerial vehicle to indicate a configuration example;

FIG. 1B is a block diagram of a physical simulation system according to a comparative example;

DESCRIPTION OF EMBODIMENTS

Figure 2A:
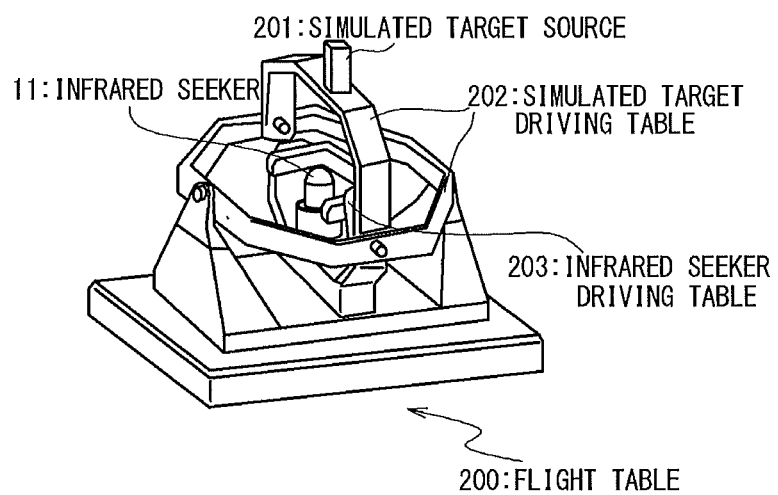
FIG. 2A is a schematic diagram of a support structure for a test target device according to a comparative example.

Some embodiments will be described with reference to the attached drawings. In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An optical test apparatus according to some embodiments is used for testing, for example, an image acquisition device such as an infrared seeker mounted on an aerial vehicle. Firstly, a configuration example of the aerial vehicle will be explained. Note that the aerial vehicle is, for example, a missile.

FIG. 1A is a schematic diagram of the aerial vehicle to indicate the configuration example. Components of the aerial vehicle 10 according to the configuration example shown in FIG. 1A will be explained. The aerial vehicle 10 shown in FIG. 1A includes an infrared seeker 11, an autopilot system 12, a steering device 13, a propulsion device 14 and steering wings 15. Note that FIG. 1A is a simplified diagram. The aerial vehicle 10 may include other components which are not indicated in FIG. 1A.

Connection relationship of the components shown in FIG. 1A will be explained. An output (e.g. an output port) of the infrared seeker 11 is connected to an input (e.g. an input port) of the autopilot system 12. In other words, the infrared seeker 11 is communicably connected to the autopilot system 12 via wire connection or wireless connection. An output (e.g. an output port) of the autopilot system 12 is connected to an input (e.g. an input port) of the steering device 13. In other words, the autopilot system 12 is communicably connected to the steering device 13 via wire connection or wireless connection. An output (e.g. an output port) of the steering device 13 is connected to an input (e.g. an input port) of the steering wings 15. In other words, the steering device 13 is connected to the steering wings 15 via wire connection or wireless connection.

An operation of the components shown in FIG. 1A will be explained. The infrared Seeker 11 optically observes a target (a simulated target) in an infrared band and outputs a signal corresponding to the observed result. The infrared seeker 11 may be configured to receive a parallel light, in order to mainly obtain an image of the target located far away from the infrared seeker 11. The infrared seeker 11 may include a driving device to move an optical axis of the optical observation system in order to move a range of obtainable viewing (e.g. a field of view) at a time.

The autopilot system 12 calculates a direction toward which the aerial vehicle should fly based on an output signal from the infrared seeker 11, calculates a target steering angle, which is a steering command value, of each steering wing based on the calculated direction, and outputs a signal corresponding to the calculated target steering angle of each steering wing.

The steering device 13 controls a direction (a steering angle) of each steering wing 15 based on the output signal from the autopilot system 12.

The propulsion device 14 generates thrust by combusting solid fuel etc.

In order to test an overall operation (or a part of operation) of the aerial vehicle, a physical simulation apparatus (a comparative example) may be used as an example. Here, the configuration example of the physical simulation apparatus according to the comparative example will be explained.

FIG. 1B is a block diagram of the physical simulation apparatus 100 according to the comparative example. Components of the physical simulation apparatus 100 shown in FIG. 1B will be explained. The physical simulation apparatus 100 shown in FIG. 1B includes a simulation arithmetic unit 110, an aerial vehicle control panel 120 (i.e. a second control unit 120), and a simulated target control unit 130 (i.e. a first control unit 130), an aerodynamic load simulating device 140, a flight arithmetic device 150 (i.e. a flight command calculating device 150), a simulated target 201 (i.e. a simulated target source 201), a simulated target driving table 202 (i.e. a simulated target driving mechanism 202) and an infrared seeker driving table 203 (i.e. an infrared seeker driving mechanism 203).

Note that FIG. 1B indicates a state in which the physical simulation apparatus 100 is executing a test using the infrared seeker 11 and the steering device 13 among the components of the aerial vehicle 10 shown in FIG. 1A. Note that the steering device 13 shown in FIG. 1B may further include the steering wings 15. Moreover, the flight arithmetic device 150 may include the autopilot system 12 of the aerial vehicle 10 shown in FIG. 1A.

Connection relationship of the components shown in FIG. 1B will be explained. Outputs (e.g. output ports) of the simulation arithmetic unit 110 ($1a$, $1c$, $1j$) are connected to an input $1a$ (e.g. an input port) of the aerial vehicle control panel 120 (the second control unit), an input $1c$ (e.g. an input port) of the simulated target control unit 130 (the first control unit), and an input $1j$ (e.g. an input port) of the aerodynamic load simulating device 140, respectively. An output $1m$ (e.g. an output port) of the aerodynamic load simulating device 140 is connected to another input $1m$ (e.g. another input port) of the aerial vehicle control panel 120. Outputs $1b$, $1g$ (e.g. output ports) of the aerial vehicle control panel 120 are connected to an input $1b$ (e.g. an input port) of the infrared seeker driving table 203 and an input $1g$ (e.g. an input port) of the infrared seeker 11, respectively. Outputs $1d$, $1e$ (e.g. output ports) of the simulated target control unit 130 are connected to an input $1d$ (e.g. an input port) of the simulated target 201 and an input $1e$ (e.g. an input port) of the simulated target driving table 202, respectively. The simulated target 201 is fixed to the simulated target driving table 202. The infrared seeker 11 receives infrared light $1f$ emitted from the simulated target 201. The infrared seeker 11 is fixed to the infrared seeker driving table 203. An output $1h$ (e.g. an output port) of the infrared seeker 11 is connected to an input $1h$ (e.g. an input port) of the flight arithmetic device 150. An output $1i$ (e.g. an output port) of the flight arithmetic device 150 is connected to an input $1i$ (e.g. an input port) of the steering device 13. An output $1l$ (e.g. an output port) of the steering system 13 is connected to an input $1l$ (e.g. an input port) of the aerial vehicle control panel 120. The steering device 13 and the aerodynamic load simulating device 140 are aerodynamically connected to each other and are influenced by each other. Therefore, the steering device 13 is influenced, as shown in FIG. 1B with the arrow $1k$, by the aerodynamic load simulating device 140.

An operation of the components shown in FIG. 1B will be explained. The simulation arithmetic unit 110 performs a simulation regarding operations of the simulated target 201 and the aerial vehicle (or at least one component of the aerial vehicle). The simulation arithmetic unit 110 totally controls the physical simulation apparatus 100. The aerial vehicle control panel 120 controls an operation of the infrared seeker driving table 203 under the control (as indicated by the arrow $1a$) executed by the simulation arithmetic unit 110 (as indicated by the arrow $1b$). The simulated target control unit 130 controls operations of the simulated target 201 and the simulated target driving table 202 under the control (as indicated by the arrow $1c$) executed by the simulation arithmetic unit 110 (as indicated by the arrows $1d$, $1e$). The infrared seeker driving table 203, which holds the infrared seeker 11, realizes a motion of the aerial vehicle in a simulated manner under the control (as indicated by the arrow 1b) executed by the aerial vehicle control panel 120. The infrared seeker driving table 203 especially controls an attitude of the infrared seeker 11. The simulated target driving table 202, which holds the simulated target 201, realizes a motion of the simulated target 201 and a locational relationship between the aerial vehicle and the simulated target in a simulated manner under the control (as indicated by the arrow 1e) executed by the simulated target control unit 130. In other words, the simulated target driving table 202 controls the locational relationship between the simulated target 201 and the infrared seeker 11. The simulated target 201 (i.e. the simulated target source 201) realizes an optical operation of the simulated target, to which the aerial vehicle aims, under the control (as indicated by the arrow 1d) executed by the simulated target control unit 130. Especially, the simulated target 201 emits the light in the infrared band toward the infrared seeker 11 as indicated by the arrow 1f. The infrared seeker 11 adjusts an optical axis direction of the optical observation system based on the infrared light emitted from the simulated target 201 and the control executed by the aerial vehicle control panel 120, receives the infrared light as indicated by the arrow 1f, and outputs the observation result (e.g. image data) to the flight arithmetic device 150 as indicated by the arrow 1h. The flight arithmetic device 150 calculates the direction toward which the aerial vehicle should fly based on the output 1h (e.g. image data) from the infrared, seeker, and outputs the calculated result (e.g. the steering command value) to the steering device 13 as indicated by the arrow 1i. The aerodynamic load simulating device 140 realizes a state of the atmosphere around the aerial vehicle in a simulated manner under the control (as indicated by the arrow 1j) executed by the simulation arithmetic unit 110. Especially, the aerodynamic load simulating device 140 realizes a relative wind direction and a relative wind speed to the aerial vehicle (as indicated by the arrow 1k). The steering device 13 realizes a direction in which the aerial vehicle tries to be thrust under the control executed by the flight arithmetic device 150 as indicated by the arrow 1i, and is subjected to aerodynamic resistance from the aerodynamic load simulating device 140 at the same time as indicated by the arrow 1k. The aerial vehicle control panel 120 calculates a position and attitude of the aerial vehicle realized by the mutual influence between the motion of the steering device 13 and the action of the aerodynamic load simulating device 140 based on feedback (1l, 1m) from the steering device 13 and the aerodynamic load simulating device 140, and outputs the calculated result (the calculated position and attitude) to the simulation arithmetic unit 110 as indicated by the arrow 1n.

As described above, the physical simulation apparatus 100 shown in FIG. 1B can test the operation of the aerial vehicle by applying the optical influence, to which the aerial vehicle is subjected, and the aerodynamic influence, to which the aerial vehicle is subjected, to some of the components of the aerial vehicle and by feeding back the motion of each component of the aerial vehicle in response to these inputs (the optical influence, the aerodynamic influence, etc.).

Regarding the physical simulation apparatus 100 according to the comparative example as shown in FIG. 1B, the simulated target driving table 202 moves the simulated target 201 with two degrees of freedom (two axis degree of freedom) and the infrared seeker driving table 203 moves the infrared seeker 11 with three degrees of freedom (three axis degree of freedom). To achieve the independent degrees of freedom of a total of five axes, assembly of the simulated target driving table 202 and the infrared seeker driving table 203 becomes very large and has a complicated structure. A configuration example of the flight table (i.e. the support structure), which is the assembly of the simulated target driving table 202 and the infrared seeker driving table 203 will be explained.

FIG. 2A is a schematic diagram of the flight table (the support structure) according to the comparative example. Components of the flight table shown in FIG. 2A will be explained. The flight table shown in FIG. 2A includes the simulated target 201 (the simulated target source), the simulated target driving table 202, and the infrared seeker driving table 203 as a supporting portion for supporting the optical observation device. Note that the simulated target 201, the simulated target driving table 202, and the infrared seeker driving table 203 shown in FIG. 2A correspond to the simulated target 201, the simulated target driving table 202, and the infrared seeker driving table 203 shown in FIG. 1B, respectively.

Figure 2B:
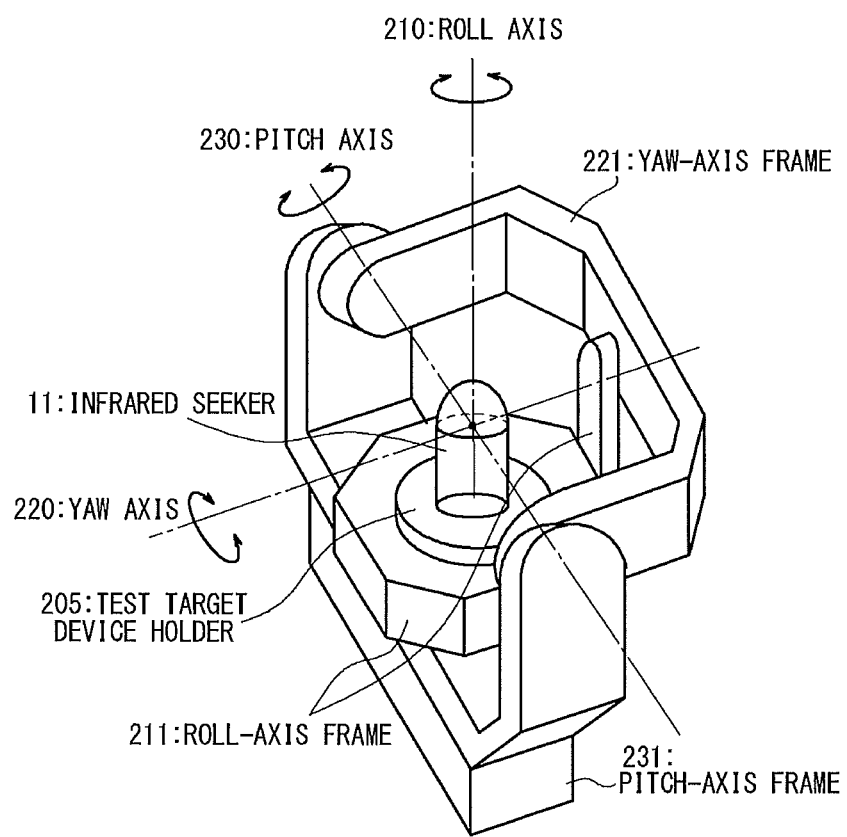
FIG. 2B is a schematic diagram of an infrared seeker holder according to a comparative example.

FIG. 2B is a schematic diagram of an infrared seeker supporting portion according to the comparative example. That is, FIG. 2B is a schematic diagram for indicating a configuration example of the infrared seeker driving table 203 shown in FIG. 2A. Components of the infrared seeker driving table 203 shown in FIG. 2B will be explained. The infrared seeker driving table 203 includes a test target device holder 205, a roll-axis frame 211 (i.e. a first frame), a yaw-axis frame 221 (i.e. a second frame), and a pitch-axis frame 231 (i.e. a third frame).

Connection relationship of the components and an operation of the components shown in FIG. 2B will be explained. The infrared seeker 11 is fixed to the test target device holder 205. The infrared seeker 11 (and the test target device holder 205) is rotatably supported by the roll-axis frame 211. Namely, there is a rotational degree of freedom about a roll axis 210 (i.e. a first axis) between the infrared seeker 11 and the roll-axis frame 211. The roll-axis frame 211 may have a motor, a gear box, etc. to allow a rotational operation about the roll axis 210.

The roll-axis frame 211 is rotatably supported by the yaw-axis frame 221. Namely, there is a rotational degree of freedom about a yaw axis 220 (i.e. a second axis) between the roll-axis frame 211 and the yaw-axis frame 221. The yaw-axis frame 221 may have a motor, a gear box, etc. to allow a rotational operation about the yaw axis 220.

The yaw-axis frame 221 is rotatably supported by the pitch-axis frame 231. Namely, there is a rotational degree of freedom about a pitch axis 230 (i.e. a third axis) between the yaw-axis frame 221 and the pitch-axis frame 231. The pitch-axis frame 231 may have a motor, a gear box, etc. to allow a rotational operation about the pitch axis 230. Note that the pitch-axis frame 231 serves as a base of the flight table. Alternatively, the pitch-axis frame 231 can be fixed to the base (not shown) of the flight table.

Thus, the infrared seeker driving table 203 shown in FIG. 2B realizes rotational operation of the infrared seeker 11 with three degrees of freedom (three axis degree of freedom) in response to the control executed by the aerial vehicle control panel 120 using three frames having nested structure.

Similarly, the simulated target driving table 202 shown in FIG. 2A has two frames, which realize a rotational operation about the pitch axis 230 and a rotational operation about the yaw axis 220, and a base. The two frames and the base are connected to each other, have nested structure, and support the simulated target 201. The simulated target driving table 202 realizes rotational operation of the simulated target 201 with two degrees of freedom (two axis degree of freedom) in response to the control executed by the simulated target control unit 130.

As shown in FIG. 2A, the simulated target driving table 202 itself is arranged outside of the infrared seeker driving table 203 to form a nested structure. As mentioned above, the flight table according to the comparative example has five frames having the nested structure. Therefore, the flight table 200 according to the comparative example is a large size table and has a complicated structure.

Figure 3:
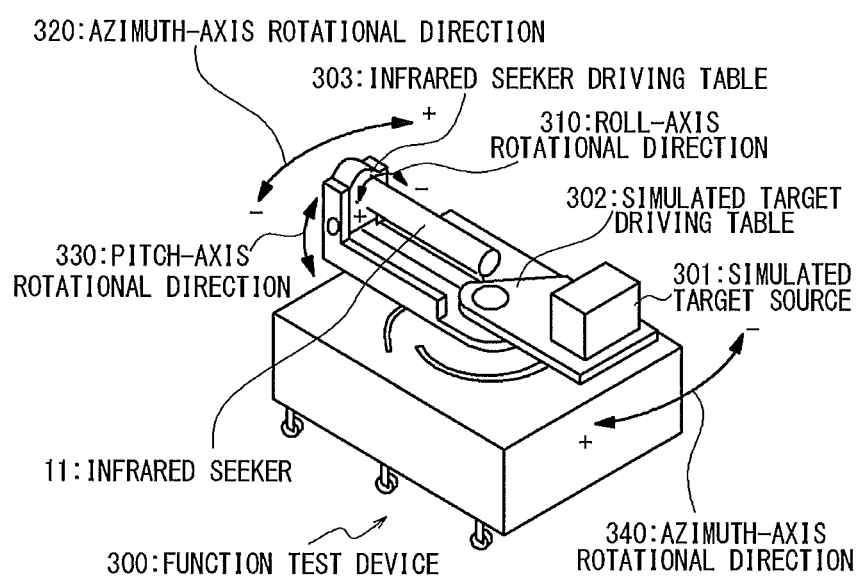
FIG. 3 is a schematic diagram of a support structure for a test target device according to another comparative example.

Next, another comparative example will be explained. FIG. 3 is a schematic diagram of a flight table (a support structure) for a test target device according to another comparative example. Components of a function test device 300 according to another comparative example shown in FIG. 3 will be explained. The function test device 300 shown in FIG. 3 includes a simulated target 301 (a simulated target source 301), a simulated target driving table 302, and an infrared seeker driving table 303 as a supporting portion for supporting the optical observation device.

Connection relationship of the components and an operation of the components shown in FIG. 3 will be explained. The simulated target driving table 302 holds the simulated target 301, and realizes a rotational operation of the simulated target 301 in a rotational direction 340 about an Azimuth axis. The infrared seeker driving table 303 holds the infrared seeker 11, and realizes rotational operations of the infrared seeker 11 with three axis degree of freedom in rotational directions (310, 320, 330) about a roll axis, Azimuth axis, and a pitch axis.

The function test device 300 shown in FIG. 3 is an apparatus for testing an operation of the infrared seeker 11 itself. The function test device 300 shown in FIG. 3 has smaller and simpler structure than the flight table 200 shown in FIG. 2A. However, a size of the function test device shown in FIG. 3 is still about two times larger than the infrared seeker 11. In addition, the function test device shown in FIG. 3 has still complicated structure to realize the rotational operations with four axis degree of freedom.

Next, an optical test apparatus according to some embodiments will be explained with reference to the attached drawings.

First Embodiment

Figure 4A:
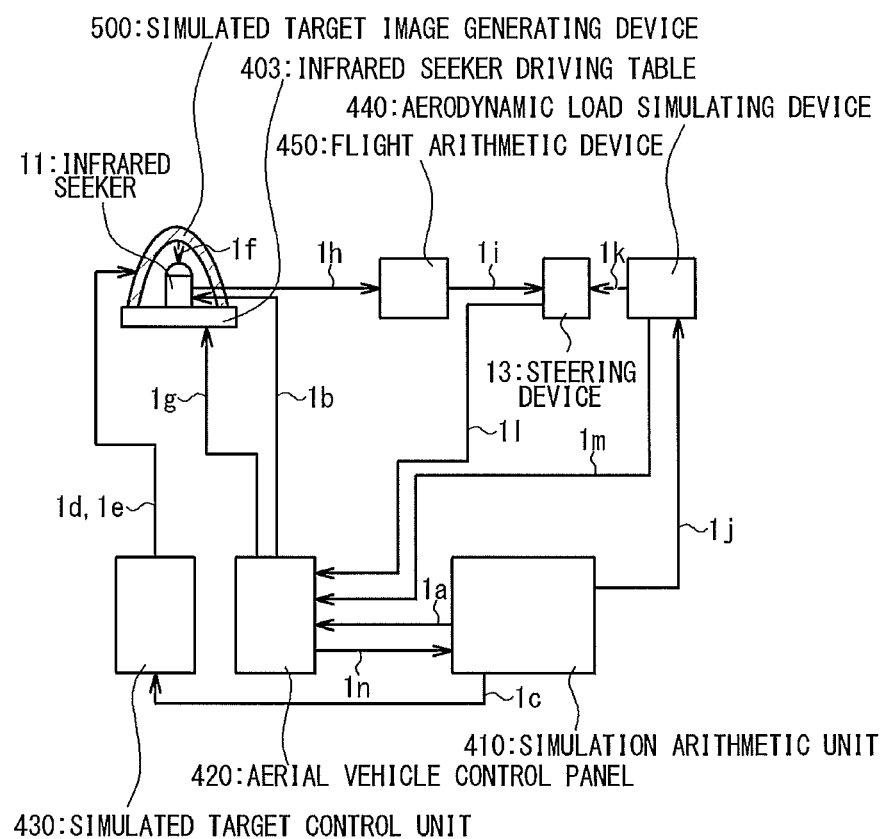
FIG. 4A is a block diagram of an optical test apparatus according to some embodiments.

FIG. 4A is a block diagram of an optical test apparatus according to a first embodiment. Components of the optical test apparatus shown in FIG. 4A will be explained. The optical test apparatus shown in FIG. 4A includes a simulation arithmetic unit 410, an aerial vehicle control panel 420 (i.e. a second control unit 420), a simulated target control unit 430 (i.e. a first control unit 430), an aerodynamic load simulating device 440, a flight arithmetic device 450 (i.e. a flight command calculating device 450), a simulated target image generating device 500 and an infrared seeker driving table 403 (i.e. an infrared seeker driving mechanism 403).

The optical test apparatus shown in FIG. 4A is the same as the physical simulation apparatus 100 shown in FIG. 1B with the assembly of the simulated target 201 and the simulated target driving table 202 replaced by the simulated target image generating device 500 shown in FIG. 4A.

In other words, the simulation arithmetic unit 410, the aerial vehicle control panel 420, the simulated target control unit 430, the aerodynamic load simulating device 440, the flight arithmetic device 450 and the infrared seeker driving table 403 shown in FIG. 4A correspond to the simulation arithmetic unit 110, the aerial vehicle control panel 120, the simulated target control unit 130, the aerodynamic load simulating device 140, the flight arithmetic device 150 and the infrared seeker driving table 203 shown in FIG. 1B, respectively. The components shown in FIG. 4A with these correspondence relationships have the same configurations, the same connection relationships and the same operations with the corresponding components shown in FIG. 1B, respectively. Therefore, regarding the components shown in FIG. 4A with these correspondence relationships, a more detailed explanation is omitted.

Figure 4B:
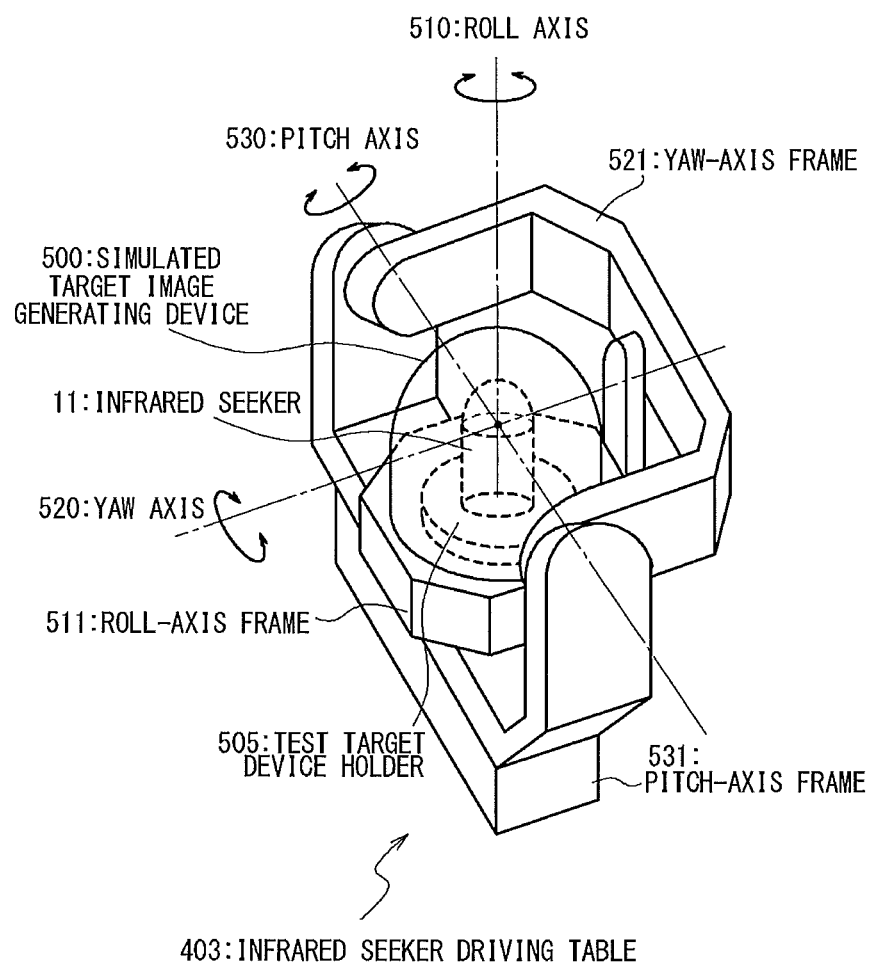
FIG. 4B is a schematic diagram of a support structure for a test target device according to some embodiments.

FIG. 4B is a schematic diagram for indicating an installation example of the simulated target image generating device 500 according to some embodiments. In other words, FIG. 4B is a schematic diagram for indicating a locational relationship between the simulated target image generating device 500 and the infrared seeker driving table 403 as an infrared seeker supporting portion.

The infrared seeker driving table 403 shown in FIG. 4B will be explained. The infrared seeker driving table 403 shown in FIG. 4B includes a test target device holder 505, a roll-axis frame 511 (i.e. a first frame), a yaw-axis frame 521 (i.e. a second frame), and a pitch-axis frame 531 (i.e. a third frame). Note that the test target device holder 505, the roll-axis frame 511, the yaw-axis frame 521 and the pitch-axis frame 531 shown in FIG. 4B correspond to the test target device holder 205, the roll-axis frame 211, the yaw-axis frame 221 and the pitch-axis frame 231 shown in FIG. 2B, respectively. In addition, a roll axis 510, a yaw axis 520 and a pitch axis 530 shown in FIG. 4B correspond to the roll axis 210, the yaw axis 220 and the pitch axis 230 shown in FIG. 2B, respectively. The components shown in FIG. 4B with these correspondence relationships have the same configurations, the same connection relationships and the same operations with the corresponding components shown in FIG. 2B, respectively. Therefore, regarding the components shown in FIG. 4B with these correspondence relationships, a more detailed explanation is omitted.

The simulated target image generating device 500 shown in FIG. 4B will be explained. As shown in FIG. 4B, the simulated target image generating device 500 is fixed to the roll-axis frame 511 (i.e. fixed to a part of the supporting portion). In this case, the infrared seeker 11 is rotatable about the roll axis 510 with respect to the simulated target image generating device 500 by rotating the test target device holder 505. Alternatively, the simulated target image generating device 500 may be fixed to the test target device holder 505 (i.e. fixed to a part of the supporting portion). In this case, the infrared seeker 11 and the simulated target image generating device 500 rotate about the roll axis 510 as an integrated component. Therefore, the infrared seeker 11 is not rotatable about the roll axis 510 with respect to the simulated target image generating device 500.

Note that the simulated target image generating device 500 has a shape of a dome (a shape of a three-dimensional dome), and is disposed so as to cover the infrared seeker 11. It is preferable to dispose the simulated target image generating device 500 to completely cover a range of directions in which the optical axis of the optical observation system installed inside the infrared seeker 11 can orient.

Figure 5A:
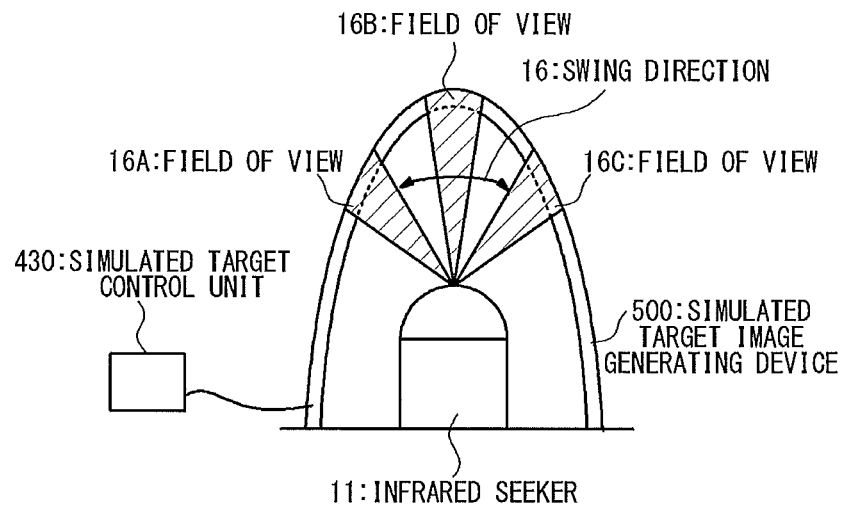
FIG. 5A is a schematic diagram for indicating a configuration example of a simulated target image generating device according to some embodiments.

FIG. 5A is a schematic diagram for indicating a configuration example of the simulated target image generating device 500 according to some embodiments. As mentioned above, the simulated target image generating device 500 (i.e. the three-dimensional dome) is disposed to cover a field of view of the infrared seeker 11 (i.e. the test target device). In FIG. 5A, a swinging direction of the optical observation optical system (i.e. the optical axis) of the infrared seeker 11 is a swing direction 16 shown in a plane of the drawing, and the field of view 16A to 16C is described as an example of the field of view. However, in practice, it is possible to swing the optical observation optical system (i.e. the optical axis) in a direction perpendicular to the drawing. Moreover, it is possible to swing the optical observation optical system (i.e. the optical axis) in an arbitrary direction which can be obtained by combining these directions. Therefore, it is preferable that the simulated target image generating device 500 has a three-dimensional dome shape.

The simulated target image generating device 500 according to some embodiments includes a plurality of light sources dispersedly arranged on the three-dimensional dome (e.g. dispersedly arranged on a n inner side of the three-dimensional dome). A part of each light source may be disposed inside the three-dimensional dome. These light sources will be explained.

Figure 5B:
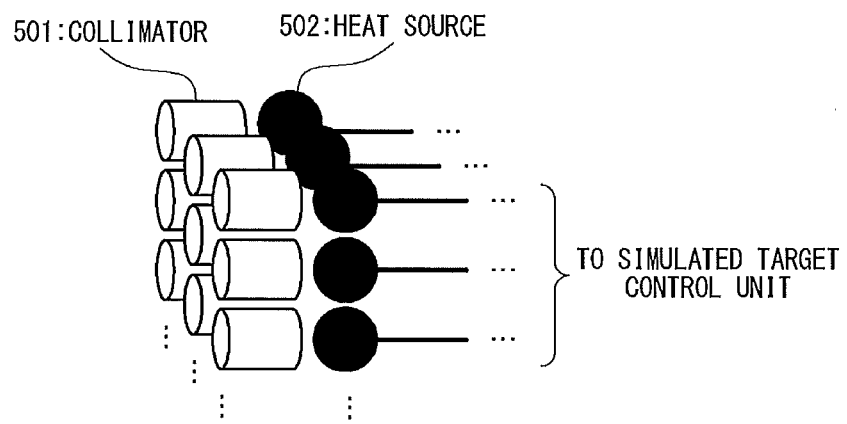
FIG. 5B is a schematic diagram for indicating a configuration example of light sources according to some embodiments.

FIG. 5B is a schematic diagram for indicating a configuration example of the light sources according to some embodiments. Components of the light sources shown in FIG. 5B will be explained. The light sources shown in FIG. 5B include a plurality of collimators 501 and a plurality of heat sources 502. Note that each heat source 502 may generate the light in the infrared band by reversely using a principle of a bolometer.

Connection relationship among the components shown in FIG. 5B will be explained. The plurality of collimators 501 is connected (optically connected) to the plurality of heat sources 502, respectively in a one-to-one correspondence. More specifically, a back side of each collimator 501 is connected (optically connected) to the corresponding heat source 502. In other words, each collimator 501 is arranged inwardly with respect to corresponding light source when viewed from the three-dimensional dome. Each collimator 501 is disposed such that the output of each collimator 501 (i.e. light guided by each collimator 501) is directed toward an inner side of the simulated target image generating device 500 (i.e. toward the infrared seeker 11). A back side of each heat source 502 is connected to the simulated target control unit 430 shown in FIG. 4A and FIG. 5A.

An operation of the components shown in FIG. 5B will be explained. Each heat source 502 generates heat, especially the light in the infrared band in response to the control executed by the simulated target control unit 430. Note that it is preferable that a characteristic of the infrared light generated by each light source 502 is equivalent with a characteristic of light generated by the target of the aerial vehicle.

In many cases, the infrared light generated by each heat source is diffusion light. The corresponding collimator (i.e. the collimator disposed in front of the each heat source) converts the diffusion light into parallel light (i.e. collimated light). Thereby, the light directed to the infrared seeker 11 matches with the optical observation system, whose focus point is set to the far, installed in the infrared seeker 11.

The simulated target control unit 430 generates a simulated target image inside the simulated target image generating device 500 by controlling the plurality of heat sources 502. More specifically, the simulated target control unit 430 generates the simulated target image, which indicates existence of the heat source (i.e. the target) in a specified direction from the infrared seeker 11, by generating infrared lights from a part of the plurality of the heat sources while the other part of the plurality of the heat sources does not generate the infrared lights or the other part of the plurality of the heat sources is maintained in a low temperature state. The location of the simulated target image can be freely changed inside the three-dimensional dome of the simulated target image generating device 500 by changing distribution of the heat sources 502 that generate the infrared lights. It is possible that, for example, the simulated target control unit 430 controls the simulated target image to simulate movement of the target (the target object).

It is possible that the size of the optical test apparatus according to some embodiments is greatly reduced and the structure of the optical test apparatus according to some embodiments is simplified by replacing the simulated target 201 and the simulated target driving table 202 by the simulated target image generating device 500. The functions of the simulated target driving table 302 and the simulated target 301 of the function test device 300 shown in FIG. 3 can be realized by the configuration according to some embodiments shown in FIG. 4B as an alternative. In this case, it is possible to reduce the size and to simplify the structure of the optical test apparatus, too.

Note that regarding the light sources according to some embodiments shown in FIG. 5B, it is possible to change a type of the light sources, intensity of light to be generated, wavelength of light to be generated, distribution density of the light sources inside the three-dimensional dome, etc. in accordance with a type of the test target device.

Second Embodiment

The heat source generating the infrared light is used as the light source according to the first embodiment. However, it is possible to use another type of light source. An alternative example according to the second embodiment will be explained.

Figure 6:
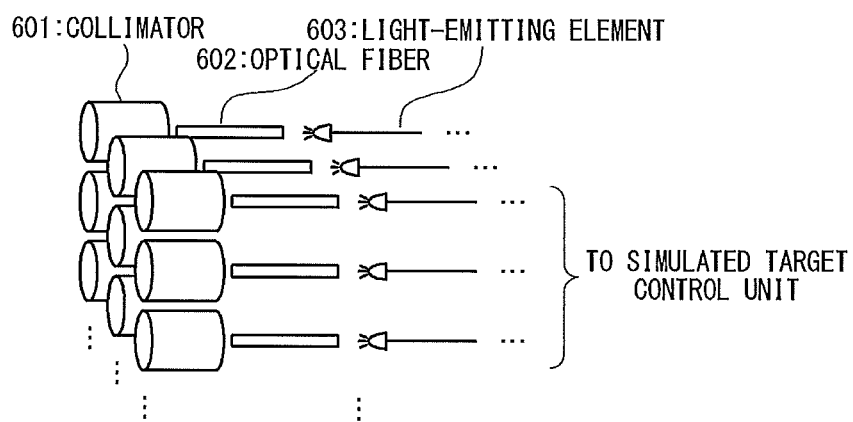
FIG. 6 is a schematic diagram for indicating a configuration example of light sources according to other embodiments.

FIG. 6 is a schematic diagram for indicating a configuration example of light sources according to the second embodiment. Components of the light sources shown in FIG. 6 will be explained. The light sources shown in FIG. 6 include a plurality of collimators 601, a plurality of optical fibers 602, and a plurality of light-emitting elements 603. Note that each of the plurality of light-emitting elements 603 may be, for example, an infrared laser oscillation device, LED (Light Emitting Diode), etc.

Connection relationship among the components shown in FIG. 6 will be explained. The plurality of collimators 601, the plurality of optical fibers 602 and the plurality of light emitting elements 603 are connected (optically connected), respectively in series in a one-to-one-to-one correspondence. More specifically, a back side of each collimator 601 is connected (optically connected) to the corresponding optical fiber 602. In addition, a back side of each optical fiber 602 is connected (optically connected) to the corresponding light-emitting element 603. Note that each collimator 601 is disposed such that the output of each collimator 601 (i.e. light guided by each collimator 601) is directed toward an inner side of the simulated target image generating device 500 (i.e. toward the infrared seeker 11, as in the first embodiment). A back side of each light-emitting element 603 is connected to the simulated target control unit 430 shown in FIG. 4A and FIG. 5A.

An operation of the components shown in FIG. 6 will be explained. Each light-emitting element 603 emits light in response to the control executed by the simulated target control unit 430. Note that it is preferable that a characteristic of the light emitted from each light-emitting element 603 is equivalent with a characteristic of light generated by the target of the aerial vehicle.

Each optical fiber 602 transmits the light emitted from the corresponding light-emitting element 603 connected to the each optical fiber to the corresponding collimator 601 connected to the each optical fiber 602.

Since operations of the collimators 601 and the simulated target control unit 430 are the same as in the first embodiment, more detailed explanation will be omitted.

The second embodiment can exert the same effects as the first embodiment. According to the second embodiment, it is expected that the simulated target image generating device 500 can be easily realized than the first embodiment using heat sources 502.

In the above mentioned embodiments, the case that the test target device is mainly the infrared seeker 11 is explained. However, the test target device is not limited to the above mentioned embodiments. It is possible to select, for example, an optical system for receiving light in another band (e.g. visible light) as the test target device. In this case, for example, a plurality of liquid crystal elements (i.e. liquid crystal display) arranged on the inner side of the three-dimensional dome can be used as the light sources.

As mentioned above, the present invention has been described by referring to embodiments. However, the present invention is not limited to the above mentioned embodiments. Various modifications can be performed on the above mentioned embodiments. Moreover, various techniques used in some embodiments or alternatives can be applicable to other embodiments or alternatives as long as the technical contradiction does not occur.

What is claimed is:

1. An optical test apparatus comprising:
    a three-dimensional dome covering a field of view of an image acquisition device as a test target device;
    a plurality of light sources dispersedly arranged on the three-dimensional dome; and
    a first control unit configured to control the plurality of light sources such that the plurality of light sources generates a predetermined image,
    wherein the plurality of light sources are fixed on an inner side of the three-dimensional dome, and
    wherein the first control unit is configured to control the predetermined image by selectively activating a part of the plurality of light sources and changing a selection of light sources to be activated.

2. The optical test apparatus according to claim 1, wherein the first control unit is configured to simulate movement of a target object by controlling the predetermined image.

3. The optical test apparatus according to claim 1, further comprising:
    a plurality of collimators arranged inwardly with respect to the plurality of light sources, respectively,
    wherein each of the plurality of collimators is configured to convert diffusion light emitted from a corresponding light source into parallel light to be directed to the test target device.

4. The optical test apparatus according to claim 1, wherein each of the plurality of light sources is a heat source emitting infrared light.

5. The optical test apparatus according to claim 4, wherein the heat source is a heat source which reversely uses a principle of a bolometer.

6. An optical test apparatus comprising:
    a three-dimensional dome covering a field of view of an image acquisition device as a test target device;
    a plurality of light sources dispersedly arranged on the three-dimensional dome; and
    a first control unit configured to control the plurality of light sources such that the plurality of light sources generates a predetermined image,
    wherein each of the plurality of light sources comprises a light-emitting element and an optical fiber configured to receive light emitted from the light-emitting element.

7. An optical test apparatus comprising:
    a three-dimensional dome covering a field of view of an image acquisition device as a test target device;
    a plurality of light sources dispersedly arranged on the three-dimensional dome;
    a first control unit configured to control the plurality of light sources such that the plurality of light sources generates a predetermined image;
    a supporting portion supporting the three-dimensional dome and the test target device and configured to adjust an attitude of the three-dimensional dome and an attitude of the test target device; and
    a second control unit configured to control movement of the supporting portion,
    wherein the supporting portion comprises a base and a test target device holder,
    wherein the three-dimensional dome is fixed to a part of the supporting portion,
    wherein the test target device is fixed to the test target device holder, and
    wherein the test target device holder is rotatably supported by the base.

8. An optical test apparatus comprising:
    a three-dimensional dome covering a field of view of an image acquisition device as a test target device;
    a plurality of light sources dispersedly arranged on the three-dimensional dome;
    a first control unit configured to control the plurality of light sources such that the plurality of light sources generates a predetermined image;
    a supporting portion supporting the three-dimensional dome and the test target device and configured to adjust an attitude of the three-dimensional dome and an attitude of the test target device;
    a second control unit configured to control movement of the supporting portion;
    a flight command calculating device; and
    a steering device,
    wherein the image acquisition device is configured to transmit image data to the flight command calculating device,
    wherein the flight command calculating device is configured to calculate a steering command value based on the image data, and
    wherein the flight command calculating device is configured to transmit the steering command value to the steering device.

9. The optical test apparatus according to claim 8, further comprising:
    an aerodynamic load simulating device configured to apply a simulated aerodynamic load on the steering device,
    a simulation arithmetic unit configured to perform a test by controlling the first control unit, second control unit and the aerodynamic load simulating device.

* * * * *